United States Patent [19]

Martin et al.

[11] Patent Number: 5,113,691

[45] Date of Patent: May 19, 1992

[54] TURBINE-MEDIUM FLOW MONITOR

[75] Inventors: James A. Martin; Andrew S. Braytenbah, both of Winter Springs, Fla.

[73] Assignee: Westinghouse Electric Corp., Pittsburgh, Pa.

[21] Appl. No.: 488,816

[22] Filed: Feb. 26, 1989

[51] Int. Cl.⁵ ............................................. G01M 15/00
[52] U.S. Cl. ......................................................... 73/116
[58] Field of Search ............ 73/861.42, 861.47, 861.48, 73/861.65–861.67, 861.79, 861.83, 116; 340/606, 611; 415/118

[56] References Cited

U.S. PATENT DOCUMENTS

| | | | |
|---|---|---|---|
| 4,007,755 | 2/1977 | Lerner et al. | 137/101.21 |
| 4,368,520 | 1/1983 | Hwang et al. | 364/494 |
| 4,451,740 | 5/1984 | Skala | 60/707 |
| 4,612,621 | 9/1986 | Kaya et al. | 364/494 |

FOREIGN PATENT DOCUMENTS 0026212  2/1982  Japan ...................... 415/118

Primary Examiner—Robert Raevis

[57] ABSTRACT

A method and device for monitoring the flow of fluid for driving a turbine, the fluid flowing through a turbine blade path between a fluid inlet and a fluid outlet, by: sensing the value of the pressure of the fluid at the fluid inlet and fluid outlet; electronically calculating the fluid flow rate on the basis of the sensed pressure values; electronically comparing the calculated flow rate with a maximum desired flow rate; and automatically issuing an indication when the calculated flow rate exceeds the maximum desired flow rate.

12 Claims, 1 Drawing Sheet

TURBINE-MEDIUM FLOW MONITOR

BACKGROUND OF THE INVENTION

The present invention relates to the monitoring of the flow of a medium along the blade path of a turbine.

Turbine blading is constructed to be subjected to a flow of propelling medium, which may be steam or gas, having a flow rate which can reach a maximum design value. If the flow rate of the propelling medium should exceed such maximum value, blade damage can result. Various abnormal operating conditions may cause the flow rate to exceed its maximum design value, such abnormal operating conditions including operation of the turbine with feedwater heaters out of service. The possibility of damage due to the maximum design flow rate being exceeded is particularly great in the case of low pressure turbine exhaust end blading.

In order to prevent the establishment of a flow rate which can cause blade damage, it is currently the practice to provide operators with special operating instructions and/or precautionary instructions. However, there is presently no instrumentation offered to alert operators that the design flow rate is being exceeded.

SUMMARY OF THE INVENTION

It is a primary object of the present invention to provide a reliable warning that the flow rate of turbine driving medium along a turbine blade path is approaching or exceeding the maximum design value.

Another object of the invention is to provide such a warning in response to direct measurements carried out in the path of flow of the medium.

The above and other objects are achieved, according to the present invention, by a method and device for monitoring the flow of fluid for driving a turbine, the fluid flowing through a turbine blade path between a fluid inlet and a fluid outlet, and the blade path being associated with a maximum desired flow rate, by: sensing the value of the pressure of the fluid at the fluid inlet and fluid outlet; electronically calculating the fluid flow rate on the basis of the sensed pressure values; electronically comparing the calculated flow rate with the maximum desired flow rate; and automatically issuing an indication when the calculated flow rate exceeds the maximum desired flow rate.

As a general rule, the maximum desired flow rate is the maximum design flow rate, the maximum design flow rate being the maximum flow rate which can be maintained without creating the danger of blade damage. In accordance with engineering practice, a given maximum design flow rate can incorporate a selected safety factor. In the description to follow, the invention will be described with reference to a system which is monitored on the basis of the maximum design flow rate of a turbine section. It is to be understood, however, that the invention could be applied to a monitoring arrangement in which the reference pressure values are associated with a maximum desired flow rate selected on the basis of factors other than, or in addition to, maximum design flow rate.

DESCRIPTION OF THE PREFERRED EMBODIMENTS

The monitoring procedure and apparatus according to the present invention are based on a recognition that the occurrence of a flow rate which exceeds, or is approaching, the maximum design, flow rate can be observed on the basis of a measurement of the absolute pressures at the propelling medium inlet and outlet for a turbine blade path. Thus, according to an equation derived from the Stodola equation:

$$\frac{W_a}{W_d} = \sqrt{\frac{P_{ain}^2 - P_{aout}^2}{P_{din}^2 - P_{dout}^2}},$$

The basic Stodola equation relates a single flow rate value to inlet and outlet pressures and includes a term which is the product of inlet pressure and specific volume of the steam. The above relation is valid, i.e., this additional term can be ignored, if the steam quality does not change greatly over time. The relation is also generally valid for monitoring different flows in the same turbine. However, that relation may not be reliable when the same blading is to be used in different turbines under widely differing steam conditions, in which case it may be necessary to introduce a reciprocal of such PV term into the numerator and denominator of the above relation.

If $W_a/W_d > 1$, the design flow rate is being exceeded. This corresponds to $$\sqrt{\frac{P_{ain}^2 - P_{aout}^2}{P_{din}^2 - P_{dout}^2}} > 1$$

Since $P_{din}$ and $P_{dout}$ are known, $$\frac{1}{\sqrt{P_{din}^2 - P_{dout}^2}} \text{ can be set equal to } C, \text{ so}$$

that the design flow rate is exceeded when:

$$C\sqrt{P_{ain}^2 - P_{aout}^2} > 1.0. \tag{1}$$

This relation can also be expressed as follows:

$$C\sqrt{(P_{ain} - P_{aout})(P_{ain} + P_{aout})} > 1.0 \tag{2}$$

The occurrence of a flow rate which exceeds a selected design value can thus be detected by measuring the absolute pressure values at the inlet and outlet of a turbine blade path and processing the measured values in a simple circuit, which may be an analog circuit, to provide an alarm if the calculation result exceeds a threshold value corresponding to unity. Moreover, since the square of the relationship at the left-hand side of each of the inequalities (1) and (2), above, will exceed unity when the relationship itself exceeds unity, the circuitry employed for producing such an alarm need not include components which perform a square root operation.

Figure 1:
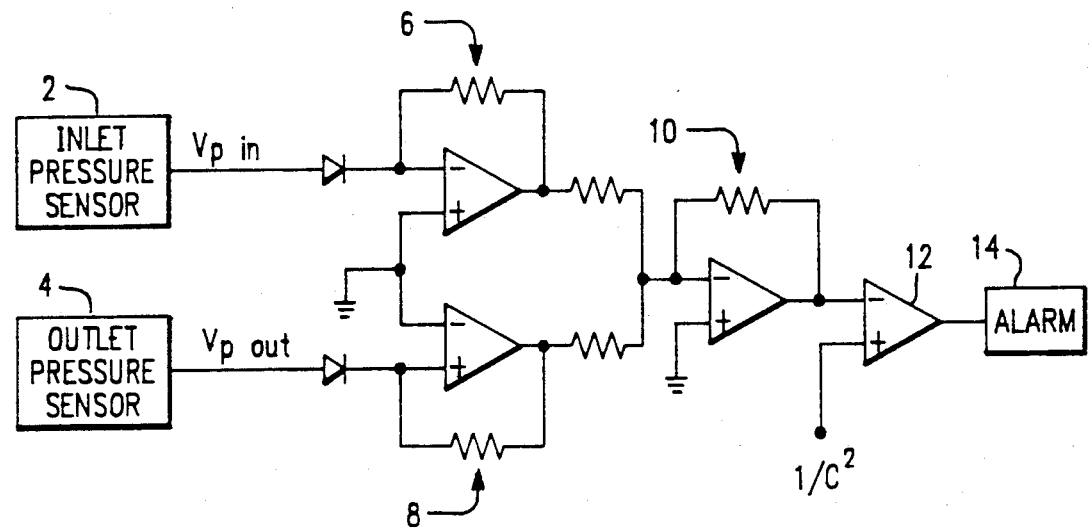
FIGS. 1 and 2 are circuit diagrams illustrating two embodiments of monitoring circuits according to the invention.

A first embodiment of a circuit for producing such an alarm is illustrated in FIG. 1 and is shown connected to the signal outputs of two pressure sensors 2 and 4. Sensors 2 and 4 may be of any conventional type constructed to produce output voltages representative of the absolute pressure of a fluid with which the sensors are in communication. Sensor 2 is disposed at the inlet of a turbine blade path, while sensor 4 is disposed at the outlet of that path.

The output signal $V_{pin}$ from sensor 2 is supplied to the signal input of a first diode operational amplifier squaring circuit 6, while the output signal $V_{pout}$ of sensor 4 is connected to the input of a second diode operational amplifier squaring circuit 8. Circuits 6 and 8 are essentially identical, except that the output signal of sensor 2 is supplied to the inverting input of the operational amplifier of circuit 6, while the output of sensor 4 is supplied to the non-inverting input of the operational amplifier of circuit 8 so that the output signals from the two circuits 6 and 8 will have respectively opposite polarities.

The output signals from circuits 6 and 8 are then supplied to an analog summation circuit 10 which, like circuits 6 and 8, is based on a conventional operational amplifier.

The output signal from summation circuit 10 is proportional to the difference between the square of the voltage produced by sensor 2 and the square of the voltage supplied by sensor 4. The output signal from circuit 10 is supplied to one input of a comparator 12. The other input of comparator 12 is supplied with a signal proportional to $1/C^2$. The output of comparator 12 is connected to the input of an alarm device 14 to produce an alarm when inequality (1), above, is true.

If it is desired to base production of the alarm signal on the square root of the difference between the squares of the input and output pressures, a square root function generator can be inserted between summation circuit 10 and the associated input of comparator 12 and the comparison input of comparator 12 can receive a signal proportional to 1/C, or the square root function generator can be inserted between the output of comparator 12 and the input of alarm device 14. Such a square root function generator could be constituted by a further operational amplifier having a squaring circuit such as circuit 6 connected in its feedback path.

Figure 2:
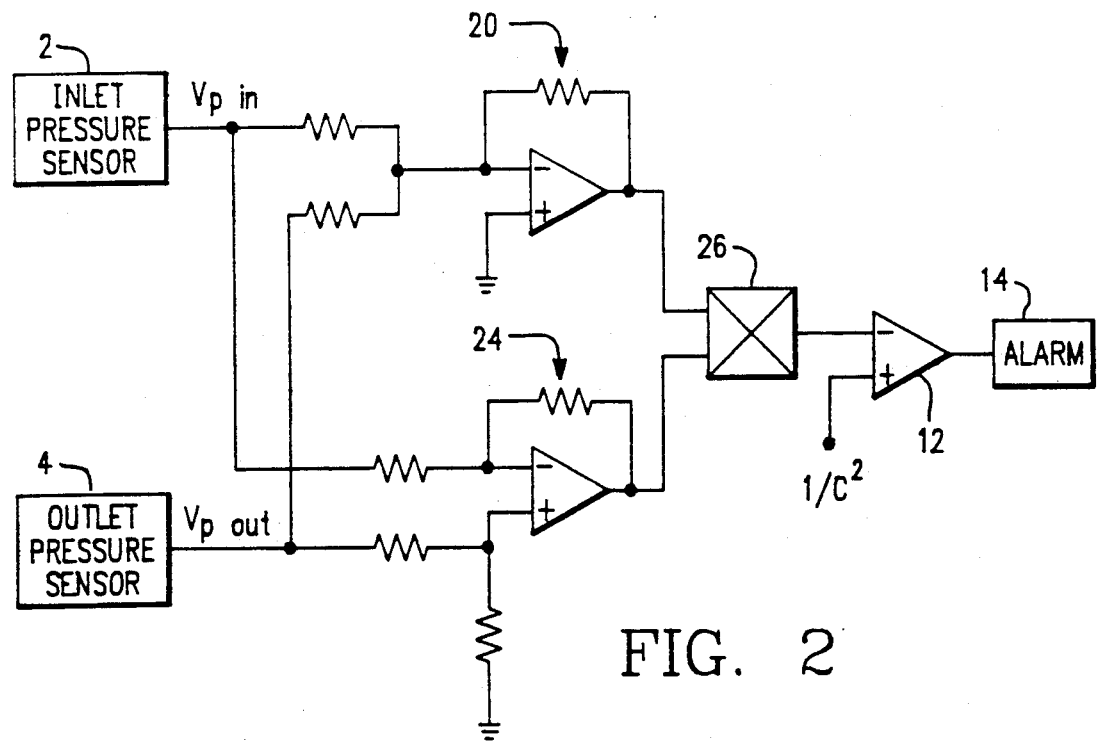

A second embodiment of the present invention, for deriving an alarm signal on the basis of inequality (2), above, is shown in FIG. 2. In this embodiment, the output signals $V_{pin}$ and $V_{pout}$ are both supplied to a summation circuit 20 and to a difference circuit 24 and the resulting sum and difference signals are supplied to respective inputs of an analog multiplier 26 whose output signal is representative of $(P_{in}-P_{out})(P_{in}+P_{out})$.

The output signal from multiplier 26 is supplied, once again, to comparator 12 where it is compared with a signal representative of $1/C^2$. The output signal from comparator 12 is supplied to alarm device 14 to produce an alarm when inequality (2) is true. Here again, the square root function can be implemented by including the square root function generator described above between the output of multiplier 26 and the corresponding input of comparator 12 or between the output of comparator 12 and the input of alarm device 14.

Each of the analog circuits illustrated in FIGS. 1 and 2 may be constituted by a conventional circuit known to be a basic building block of analog signal processors.

In monitoring systems of the type contemplated by the present invention, the inequality which produces an alarm can use, as the reference value, the maximum design flow rate or a flow rate value slightly less than maximum, to thereby allow a certain safety factor.

Since the present invention is concerned primarily with providing an alarm when a given flow rate is exceeded, reliable results can be achieved with analog systems of the type illustrated in the drawing. Such circuits are advantageous because they can be manufactured at low cost and adjusted for a specific application. However, it would be readily apparent to those skilled in the art that systems of the type contemplated by the present invention could, if desired, be composed of digital devices or could be implemented by programming a digital system provided to perform other control and monitoring functions.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A method for monitoring the flow of fluid for driving a turbine, the fluid flowing through a turbine blade path between a fluid inlet and a fluid outlet, and the blade path being associated with a maximum desired flow rate, comprising: sensing the value of the pressure of the fluid at the fluid inlet and fluid outlet; electronically calculating the fluid flow rate on the basis of the sensed pressure values; electronically comparing the calculated flow rate with the maximum desired flow rate; and automatically issuing an indication when the calculated flow rate exceeds the maximum desired flow rate.

2. A method as defined in claim 1 wherein said step of calculating is performed on the basis of the relation:

$$W \approx \sqrt{P_{ain}^2 - P_{aout}^2},$$

where
$W$ = fluid flow rate;
$P_{ain}$ = actual absolute pressure at blade path inlet; and
$P_{aout}$ = actual absolute pressure at blade path outlet.

3. A method as defined in claim 2 wherein said step of calculating is performed by deriving a first representation proportional to $P_{ain}^2$; deriving a second representation proportional to $P_a^2{}_{out}$; and deriving a third representation corresponding to the difference between the first and second representations.

4. A method as defined in claim 2 wherein said step of calculating comprises: deriving a first representation corresponding to $P_{ain}-P_{aout}$; deriving a second representation corresponding to $P_{ain}+P_{aout}$; and deriving a third representation corresponding to the product of the first and second representations.

5. A method as defined in claim 2 wherein said steps of calculating and comparing are performed by analog signal processing devices.

6. A method as defined in claim 2 wherein said step of issuing an indication comprises producing an alarm.

7. A device for monitoring the flow of fluid for driving a turbine, the fluid flowing through a turbine blade path between a fluid inlet and a fluid outlet, and the blade path being associated with a maximum desired flow rate comprising: pressure sensing means disposed for sensing the value of the pressure of the fluid at the fluid inlet and fluid outlet; first circuit means connected to said pressure sensing means for electronically calculating the fluid flow rate on the basis of the sensed pressure values; second circuit means connected to said first circuit means for electronically comparing the calculated flow rate with the maximum desired flow rate; and indicator means connected to said second circuit means for automatically issuing an indication when the calculated flow rate exceeds the maximum desired flow rate.

8. A device as defined in claim 7 wherein said first circuit means performs a calculation on the basis of the relation:

$$W \approx \sqrt{P_{ain}^2 - P_{aout}^2}.$$

where
W = fluid flow rate;
$P_{ain}$ = actual absolute pressure at blade path inlet; and
$P_{aout}$ = actual absolute pressure at blade path outlet.

9. A device as defined in claim 8 wherein said first circuit means comprises: means for deriving a first representation proportional to $P_{ain}^2$; means for deriving a second representation proportional to $P_{aout}^2$; and means for deriving a third representation corresponding to the difference between the first and second representations.

10. A device as defined in claim 8 wherein said first circuit means comprises: means for deriving a first representation corresponding to $P_{ain} - P_{aout}$; means for deriving a second representation corresponding to $P_{ain} + P_{aout}$; and means for deriving a third representation corresponding to the product of the first and second representations.

11. A device as defined in claim 8 wherein said first and second circuit means are analog signal processing devices.

12. A device as defined in claim 8 wherein said indicator means comprises means for producing an alarm.

* * * * *